(12) United States Patent
Feng

(10) Patent No.: US 8,807,473 B2
(45) Date of Patent: Aug. 19, 2014

(54) AUTOMATIC WINDING DEVICE FOR CELL CORE

(75) Inventor: Wei Feng, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 972 days.

(21) Appl. No.: 12/923,007

(22) Filed: Aug. 27, 2010

(65) Prior Publication Data

US 2011/0297780 A1   Dec. 8, 2011

(30) Foreign Application Priority Data

Jun. 3, 2010   (CN) .......................... 2010 1 0205104

(51) Int. Cl.
    *B65H 81/02*   (2006.01)
(52) U.S. Cl.
    USPC ...................... 242/434.9; 242/437; 242/432.2
(58) Field of Classification Search
    USPC ................. 242/431, 434.9, 437, 432.2, 433.1
    See application file for complete search history.

(56) References Cited

U.S. PATENT DOCUMENTS

| 4,153,493 | A | * | 5/1979 | den Hollander et al. ...... 156/188 |
| 4,296,546 | A | * | 10/1981 | Hill et al. .......................... 29/730 |
| 4,369,571 | A | * | 1/1983 | Sugalski .......................... 29/731 |
| 6,499,208 | B2 | * | 12/2002 | Schwetz et al. .............. 29/564.6 |
| 6,622,954 | B2 | * | 9/2003 | Komuro et al. ............. 242/432.2 |
| 7,472,859 | B2 | * | 1/2009 | McMahan ..................... 242/437 |
| 8,424,794 | B2 | * | 4/2013 | Wang ............................ 242/448 |
| 2006/0169822 | A1 | * | 8/2006 | Noji ........................... 242/432.2 |

* cited by examiner

*Primary Examiner* — Emmanuel M Marcelo
(74) *Attorney, Agent, or Firm* — Nixon & Vanderhye PC

(57) ABSTRACT

An automatic winding device for cell core includes a mounting seat, a locking cap mounted on one end of the mounting seat, a winding assembly driving mechanism mounted on the other end of the mounting seat and a winding assembly. The winding assembly includes two winding needles and two winding plates. One end of the winding needles is fixed to the winding driving mechanism and the other end is opposite to the locking cap. One end of the winding plates is fixed to the winding driving mechanism and the other end thereof opposite to the locking cap. The winding plates are disposed on opposing sides of the pair of winding needles and separably contact the pair of winding needles. The winding needles are held together by complementary concave and convex portions, and a groove and a ring groove are formed in the locking cap.

15 Claims, 9 Drawing Sheets

AUTOMATIC WINDING DEVICE FOR CELL CORE

This application claims priority to Chinese Application No. 201010205104.8 filed Jun. 3, 2010, the entire contents of which are hereby incorporated by reference in this application.

FIELD OF THE INVENTION

The present invention relates to a device for manufacturing battery, particularly to an automatic winding device for cell core.

BACKGROUND OF THE INVENTION

At present, cylinder-shaped or square-shaped lithium battery is widely used in electronic products, such as portable computer, cell phone and music player. The production process of the lithium battery mainly includes the following steps: firstly, winding a positive electrode plate, a negative electrode plate and separators for separating the positive electrode plate from the negative electrode plate into a cylinder-shaped or square-shaped cell core; then, injecting electrolyte into the cell core; finally, introducing a metal shell to seal the cell core. And the step of winding is the most important step in the production process.

The present winding machine for the lithium battery mainly includes two electrode plate supply units, two separator supply units, a separator fixing unit, a winding unit, a cutter and an unloading unit. Two electrode plate supply units and two separator supply units are both disposed above the separator fixing unit. Two separator supply units are disposed on both sides of one electrode plate supply unit. The winding unit is disposed between the two separator supply units and the separator fixing unit. The cutter is disposed under the separator fixing unit and the unloading unit is disposed under the cutter. Specifically, the winding unit mainly includes a mounting seat, a locking cap, a winding assembly and a winding assembly driving mechanism. The locking cap and the winding assembly driving mechanism are fixed to the opposite ends of the mounting seat respectively. One end of the winding assembly is fixed to the winding assembly driving mechanism and the other end thereof is opposite to the locking cap. And the winding assembly is driven to move and rotate about an axis of the winding assembly by the winding assembly driving mechanism. More specifically, the winding assembly includes a pair of flat-shaped winding needles which are overlapped. A rectangular locking hole is formed in the middle of the locking cap. Before winding, the end of the pair of winding needles is inserted into the locking hole and fixed by the locking hole.

During the operation of the winding machine, two separators are supplied to the separator fixing unit by two separator supply units respectively and fixed by the separator fixing unit. The winding assembly is driven to grip one separator by the winding assembly driving mechanism. Then, the starts of the two separators are spliced by a bonding unit. The positive electrode plate and the negative electrode plate are supplied to the separator gripped in the winding assembly from the both sides of the separator by two electrode plate supply units. Meanwhile, the winding assembly is driven to rotate about the axis thereof by the winding assembly driving mechanism. And two separators, the positive electrode plate and the negative electrode plate are wound following the rotation of the winding assembly, thus forming a winding core. After winding, the cutter cuts the two separators, the positive electrode plate and the negative electrode plate. The finished winding core is drawn from the winding assembly and transferred to the next procedure by the unloading unit.

However, on one hand, because the separators, which are used to separate the positive electrode plate from the negative electrode plate to preventing a short circuit therebetween, are too thin, the winding needles which are overlapped cannot grip the separator firmly during the winding process. The separator will draw out from the pair of winding needles, thus bringing the short circuit in the battery. Furthermore, in order to fix the separators to the winding assembly, the starts of two separators are spliced by a bonding unit. In such a manner, the winding process becomes more complicated, thereby reducing the production efficiency of the winding device. On the other hand, since the locking hole formed on the locking cap shapes like a rectangle to locking the winding assembly, the direction of the winding assembly must be adjusted correctly to fit the ends thereof into the locking hole, thus reducing the installation efficiency of the winding device, and thereby reducing the production efficiency of the cell core.

Hence, a need has arisen for providing an improved automatic winding device for cell core to overcome the above-mentioned problems.

SUMMARY OF THE INVENTION

Accordingly, an objective of the present invention is to provide an automatic winding device for cell core which is capable of improving the mounting efficiency and the production quality of the cell core.

To achieve the above-mentioned objective, an automatic winding device for cell core comprise a mounting seat, a locking cap mounting on one end of the mounting seat, a winding assembly driving mechanism mounting on the other end of the mounting seat and a winding assembly. The winding assembly comprises two winding needles and two winding plates. One end of the winding needle is fixed to the winding driving mechanism and the other end thereof opposite to the locking cap. One end of the winding plate is fixed to the winding driving mechanism and the other end thereof opposite to the locking cap. Two winding plates are disposed on both sides of the pair of winding needles respectively and contact to the pair of winding needles separably. One side of one winding needle has a concave portion and one side of the other winding needle has a convex portion that fits into the concave portion separably. A first protrusion is formed on the end of each winding needle opposite to the locking cap and a second protrusion is formed on the end of each winding plate opposite to the locking cap. A groove and a ring groove are formed in the locking cap in sequence. The first protrusion of the winding needle is locked in the groove and the second protrusion of the winding plate is locked in the ring groove.

According to one embodiment of the present invention, both the cross section of the convex portion and the cross section of the concave portion are V-shaped.

According to another embodiment of the present invention, the groove is a taper groove or a circular groove.

According to still another embodiment of the present invention, a plurality of circular holes are formed on the bottom of the ring groove, the pair of second protrusions is locked in the circular holes.

Preferably, the winding assembly driving mechanism comprises a moving seat, a first power source, a second power source, a driving motor and a transmission assembly, the first power source is fixed to the mounting seat and one end thereof is fixed to the moving seat, the moving seat is slideable connected to the mounting seat, the second power source is fixed on the moving seat and one end thereof is fixed to the transmission assembly, the driving motor is connected to the transmission assembly through a belt wheel, both one end of the winding needle and one end of the winding plate are connected to the transmission assembly.

Preferably, at a least a first slider is provided on the bottom of the moving seat, at a least a first slider way is provided on the mounting seat, the moving seat slides on the mounting seat by the combination of the first slider and the first slider way.

Preferably, the transmission assembly comprises a connector, a drive shaft, a winding assembly supporting block and a winding assembly control component, the connector is fixed to the second power source, one end of the drive shaft is inserted into the connector and the other end thereof is fixed to the winding assembly control component, the drive shaft is connected to the driving motor through the belt wheel, the winding assembly control component is slidable connected to the winding assembly supporting block.

Preferably, the connector comprises a connection block, a plane wheel and a pair of rollers, one end of the connection block is fixed to the second power source, the pair of rollers is fixed on the connection block, the plane wheel is sandwiched between the pair of rollers, the end of the drive shaft is fixed in the center of the plane wheel.

Preferably, the winding assembly control component comprises a cam, two first cam followers, two second cam followers and two elastic elements, one end of the cam is fixed to the drive shaft and the other end thereof is supported on the winding assembly supporting block through a cam supporting seat fixed on the winding assembly supporting block, two first cam followers are provided on the both sides of the cam respectively and move following cam surfaces of the cam, two second cam followers are provided on the both sides of the cam respectively and move following the cam surfaces of the cam, both one side of the first cam follower and one side of the second cam follower are slidable connected to the winding assembly supporting block, two first cam followers are fixed to opposite ends of one elastic element respectively, two second cam followers are fixed to opposite ends of the other elastic element respectively, two winding needles are fixed to the other sides of two first cam followers respectively and two winding plates are fixed to the other sides of two second cam followers respectively.

Preferably, the first cam follower comprises a first fixing block, a first connection shaft and a first roller wheel, a first cavity is formed in one side of the first fixing block, the first roller wheel is accommodated in the first cavity, the first connection shaft passes through the first fixing block and the first roller wheel in sequence for mounting the first roller wheel into the first cavity, the first roller wheel moves following the cam surface of the cam; the second cam follower comprises a second fixing block, a second connection shaft and a second roller wheel, a second cavity is formed in one side of the second fixing block, the second roller wheel is accommodated in the second cavity, the second connection shaft passes through the second fixing block and the second roller wheel in sequence for mounting the second roller wheel into the second cavity, the second roller wheel moves following the cam surface of the cam.

Preferably, at least two second sliders are provided on the first fixing block and the second fixing block respectively, at least two second slide ways are provided on the winding assembly supporting block, the first fixing block slide on the mounting seat by the combination of the second slider and one of the second slider ways, the second fixing block slide on the mounting seat by the combination of the second slider and the other of the second slider ways.

Preferably, the winding device further comprises a cylinder. The cylinder is fixed to the locking cap for driving the locking cap to move along the axis thereof.

Preferably, both the first power source and the second power source are cylinders, and the elastic element is a spring.

Preferably, the driving motor is a controllable motor or a step motor.

In comparison with the prior art, firstly, the separators are gripped in the pair of winding needles firmly through the combination of the convex portion and the concave portion, thus separating a positive electrode plate from a negative electrode plate availably, in turn, preventing a short circuit in the battery, thereby improving the production quality of the cell core. Secondly, due to the groove and the ring groove formed in the locking cap, the mounting direction of the winding assembly are not limited, thus improving the installation efficiency of the winding device, and thereby improving the production efficiency of the cell core. Thirdly, because two winding plates contact to the pair of the winding needles separably, the pair of winding plates expands before winding and contracts after winding, thus a finished cell core can be easily drawn from the winding assembly.

Other aspects, features, and advantages of this invention will become apparent from the following detailed description when taken in conjunction with the accompanying drawings, which are a part of this disclosure and which illustrate by way of example, principles of this invention.

DETAILED DESCRIPTION OF ILLUSTRATED EMBODIMENTS

Figure 1:
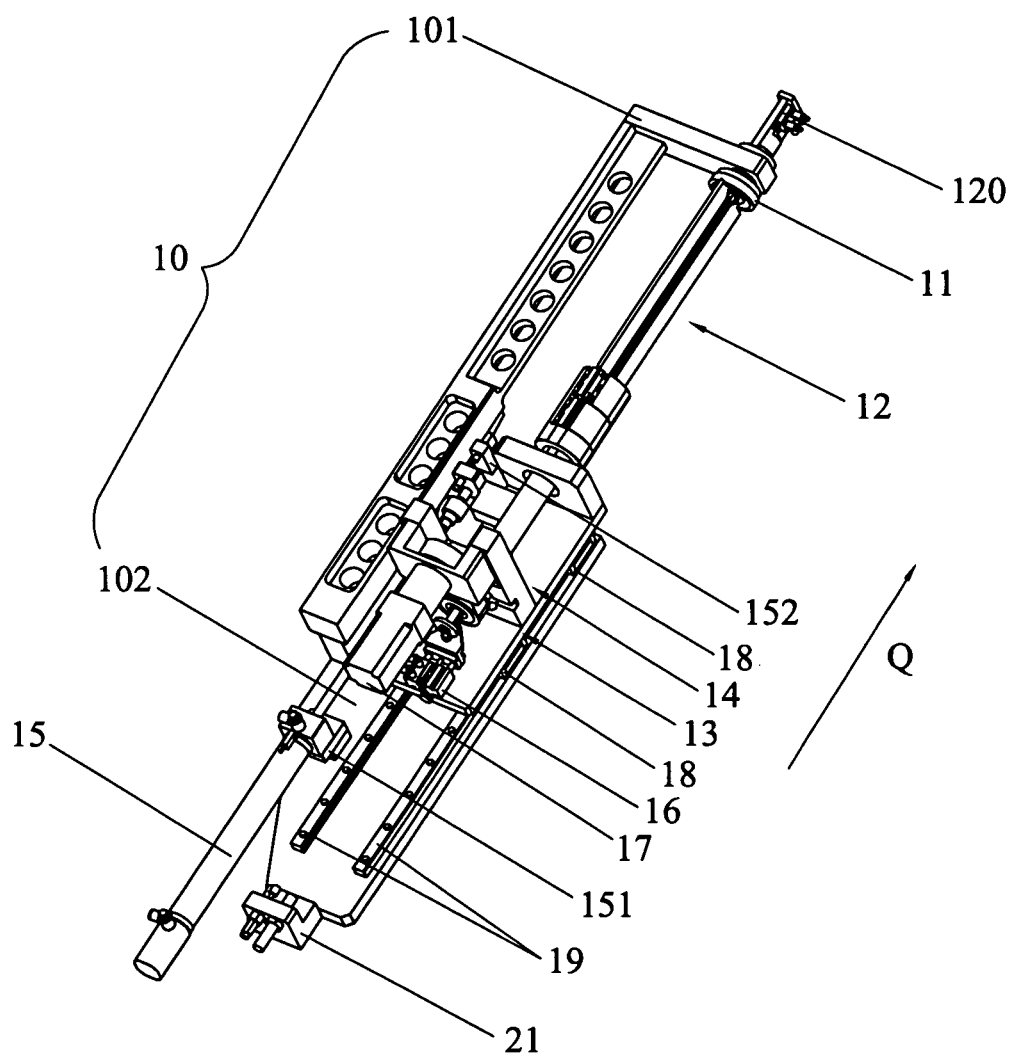
FIG. 1 is a perspective view showing the automatic winding device for cell core according to an embodiment of the present invention.
Figure 2:
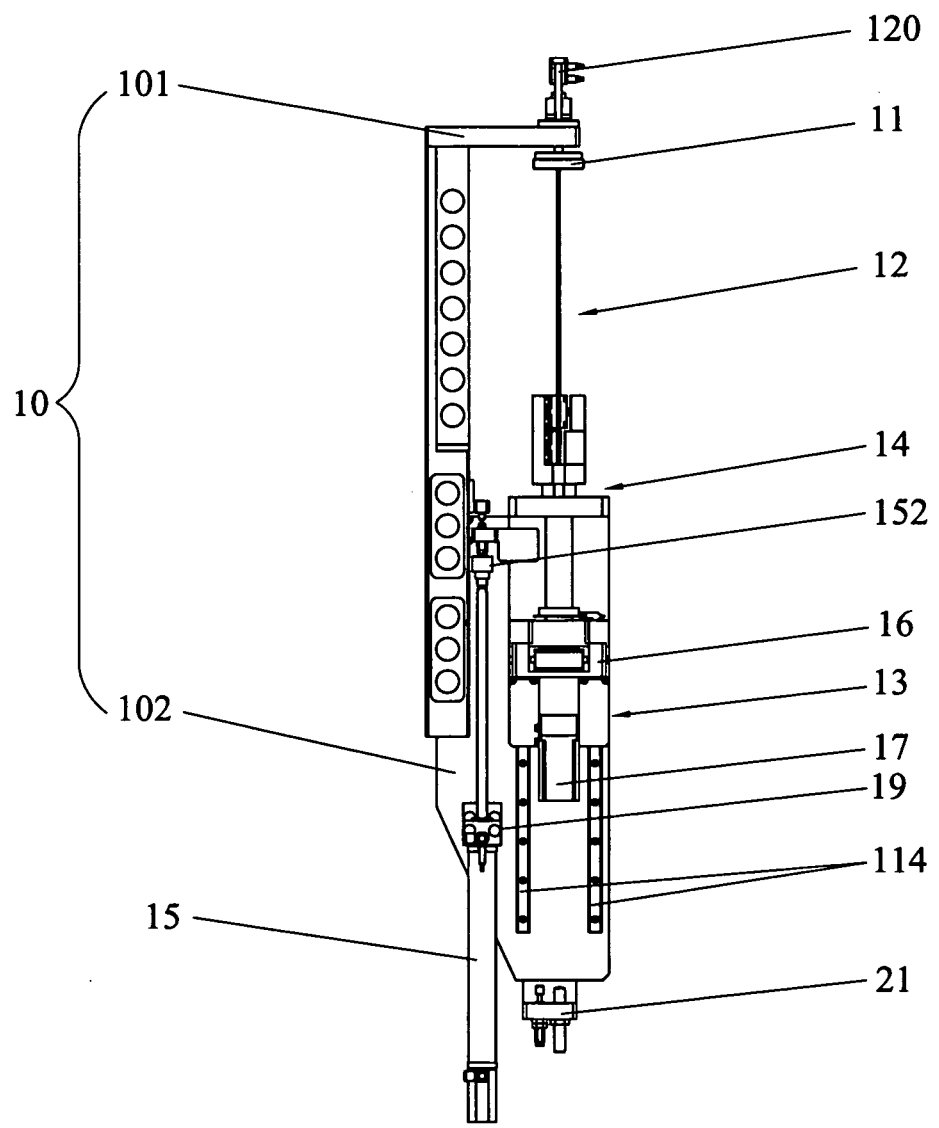
FIG. 2 is a top plan view of the automatic winding device for cell core shown in FIG. 1.

Various preferred embodiments of the invention will now be described with reference to the figures, wherein like reference numerals designate similar parts throughout the various views. FIGS. 1-2 show an automatic winding device 100 for cell core according to an embodiment of the present invention. The automatic winding device 100 includes a mounting seat 10, a locking cap 11, a winding assembly 12 and a winding assembly driving mechanism. The mounting seat 10 includes a supporting bracket 101 and a supporting seat 102 fixed to the supporting bracket 101. The locking cap 11 is fixed on the supporting bracket 101 and a cylinder 120 is fixed to the locking cap 11 for driving the locking cap 11 to move along the axis thereof. Concretely, a ball bush (not shown) is provided inside the supporting bracket 101. One end of the locking cap 11 passes through the ball bush and inserts into a bearing (not shown) which is connected to the cylinder 120. The winding assembly driving mechanism is mounted on the supporting seat 102. One end of the winding assembly 12 is fixed to the winding assembly driving mechanism and the other end thereof is opposite to the locking cap 11. Specifically, the winding assembly 12 includes two winding needles 121, 122 and two winding plates 123,124. Both one end of the winding needle 121 and one end of the winding needle 122 are fixed to the winding driving mechanism. And both the other end of the winding needle 121 and the other end of the winding needle 122 are opposite to the locking cap 11. Both one end of the winding plate 123 and one end of the winding plate 124 are fixed to the winding driving mechanism And both the other end of the winding plate 123 and the other end of the winding plate 124 are opposite to the locking cap 11. Two winding plates 123,124 are disposed on both sides of the pair of winding needles 121, 122 respectively and contact to the pair of winding needles 121, 122 separably. Preferably, a position limiter 21 is provided on one end of the supporting seat 102 for limiting the travel of the winding assembly driving mechanism.

Figure 3:
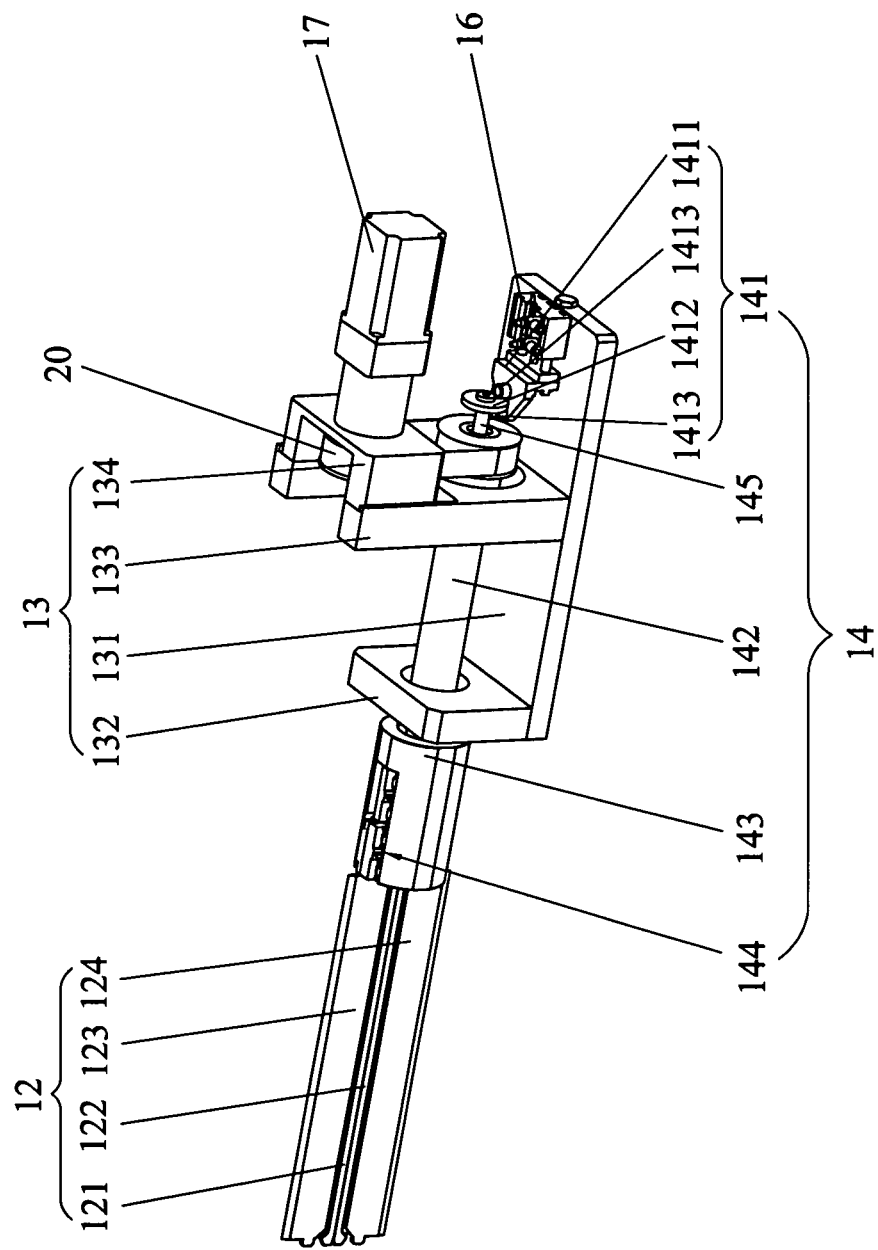
FIG. 3 is a perspective view showing that the winding assembly driving mechanism and the winding assembly are assembled.

Referring to FIGS. 1-3, the winding assembly driving mechanism includes a moving seat 13, a transmission assembly 14, a first power source 15, a second power source 16 and a drive motor 17. The moving seat 13 includes a bottom seat 131, a first supporting plate 132, a second supporting plate 133 and a third supporting plate 134. The first supporting plate 132 and the second supporting plate 133 are parallel to each other and both are perpendicular to the bottom seat 131. The third supporting plate 134 is perpendicular to the upper end of the second supporting plate 133 for mounting the drive motor 17. Two pairs of first sliders 18 are provided on the bottom of the bottom seat 131 and a pair of first slider ways 19 is provided on the supporting seat 102. The bottom seat 131 slides on the supporting seat 102 by the combination of the first slider 18 and the first slider way 19. The first power source 15 is mounted on the supporting seat 102 by a first mounting block 151 and the output shaft of the first power source 15 is fixed to a driving block 152 which is fixed to one side of the moving seat 13. The second power source 16 is fixed on the bottom seat 131 for driving the transmission assembly 14. Concretely, the transmission assembly 14 includes a connector 141, a driving sleeve 142, a winding assembly supporting block 143, a winding assembly control component 144 and a drive shaft 145. Furthermore, the connector 141 includes a connection block 1411, a round plane wheel 1412 and a pair of rollers 1413. One end of the connection block 1411 is connected to the second power source 16. The pair of rollers 1413 is fixed on the connection block 1411, and the plane wheel 1412 is sandwiched between the pair of rollers 1413. The driving sleeve 142 passes through the second supporting plate 133 and the first supporting plate 132 in sequence and fixes to the winding assembly supporting block 143. One end of the drive shaft 145 is fixed in the center of the plane wheel 1412 and the other end thereof passes through the driving sleeve 142 to connect to the winding assembly control component 144. The winding assembly control component 144 is slideable connected to the winding assembly supporting block 143. The drive motor 17 is mounted on the third supporting plate 134 and connected to the driving sleeve 142 by a belt wheel 20. Concretely, one end of the belt wheel 20 is connected to the output shaft of the drive motor 17 and the other end thereof is connected to the driving sleeve 142. Preferably, the first power source 15 and the second power source 16 are cylinders.

Figure 4:
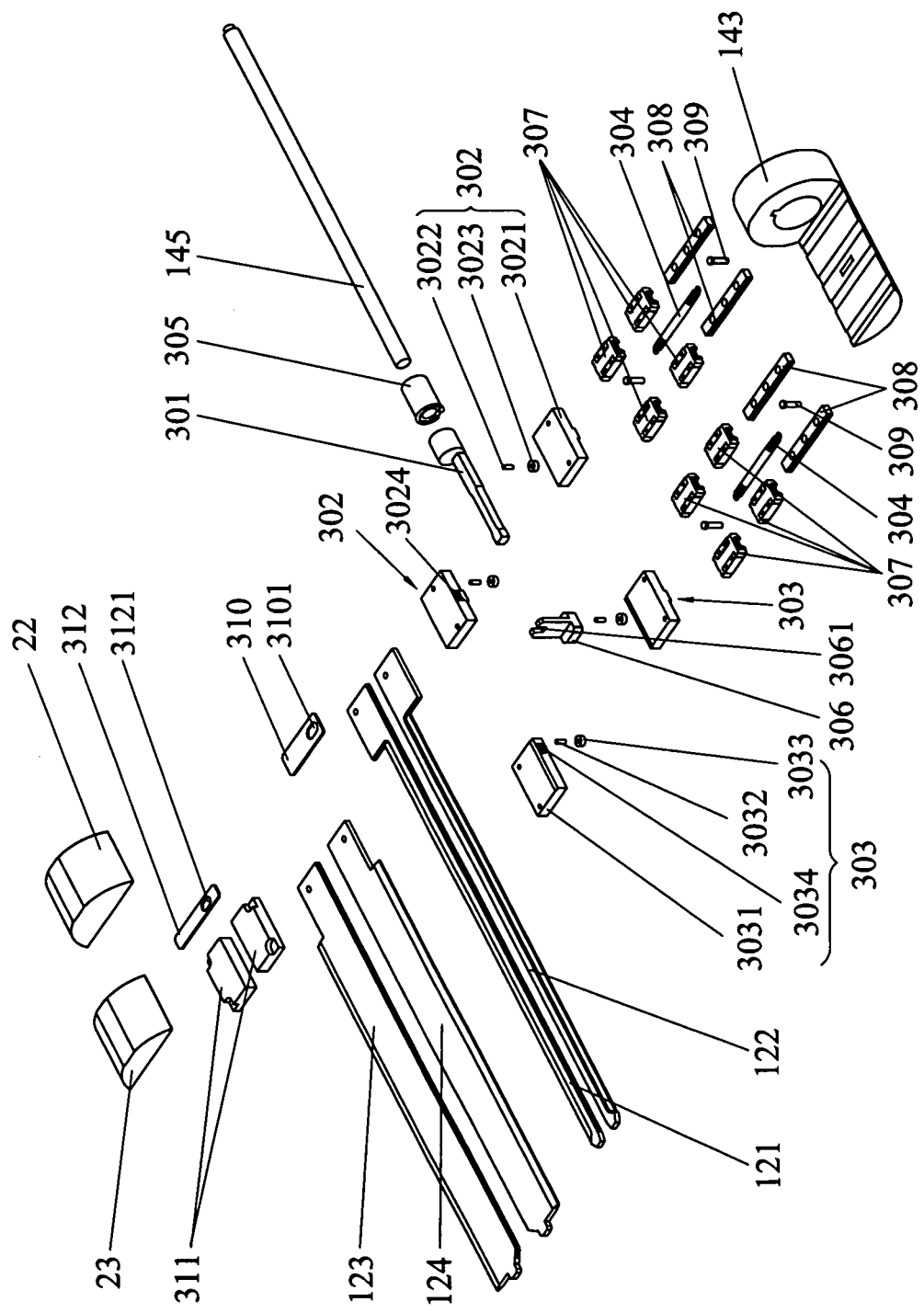
FIG. 4 is a partially schematic view showing the connection between the transmission assembly and the winding assembly.

Referring to FIG. 4, the winding assembly control component 144 includes a cam 301, two first cam followers 302, two second cam followers 303 and two elastic elements 304. One end of the cam 301 is fixed to the drive shaft 145 through a fixing element 305, and the other end thereof is supported by a cam supporting seat 306 mounted on the winding assembly supporting block 143. Specifically, the other end of the cam 301 is clipped in a recess 3061 of the cam supporting seat 306. Two first cam followers 302 are provided on the both sides of the cam 301 respectively and located near the drive shaft 145. Moreover, two first cam followers 302 move following both cam surfaces of the cam 301. Concretely, the first cam follower 302 includes a first fixing block 3021 with a first cavity 3024 formed inside, a first connection shaft 3022 and a first roller wheel 3023. The first roller wheel 3023 is accommodated in the first cavity 3024 and mounted to the first fixing block 3021 by the first connection shaft 3022. Similar to the first cam follower 302, two second cam followers 303 are provided on the both sides of the cam 301 respectively and located far from the drive shaft 145. Moreover, two second cam followers 303 move following both cam surfaces of the cam 301. Concretely, each second cam follower 303 includes a second fixing block 3031 with a second cavity 3034 formed inside, a second connection shaft 3032 and a second roller wheel 3033. The second roller wheel 3033 is accommodated in the second cavity 3034 and mounted to the second fixing block 3031 by the second connection shaft 3032. The pair of first roller wheels 3023 and the pair of second roller wheels 3033 move following both cam surfaces of the cam 301. A pair of second sliders 307 is provided on both each first fixing block 3021 and each second fixing block 3031. Two pairs of second slider ways 308 is provided on the winding assembly supporting block 143. The first fixing block 3021 slide on the winding assembly supporting block 143 by the combination of the second slider 307 and one pair of the second slider ways 308. And the second fixing block 3031 slide on the winding assembly supporting block 143 by the combination of the second slider 307 and the other pair of the second slider ways 308. Each elastic element 304 is provided between the pair of paralleled second sliders 307. The opposite ends of one elastic element 304 are fixed to two first fixing blocks 3021 respectively by a pair of pins 309. The opposite ends of the other elastic element 304 are fixed to two second fixing blocks 3031 respectively by another pair of pins 309. Two winding needles 121,122 are fixed on two first fixing blocks 3021 respectively. Two opposite ends of a first connection pad 310 are connected to two winding needles 121,122 respectively. A first dowel (not shown) passes through a first sliding hole 3101 formed on one end of the first connection pad 310, the winding needle 122 and the first fixing block 3021 to connect the first connection pad 310, the winding needle 122 and the first fixing block 3021 together. Moreover, the first dowel slides in the first sliding hole 3101. Two winding plates 123, 124 are fixed on two second fixing blocks 3031 respectively. Two third fixing blocks 311 are disposed on two winding plates 123,124 respectively. And two opposite ends of a second connection pad 312 are fixed to two third fixing blocks 311 respectively. A second dowel (not shown) passes through a second sliding hole 3121 formed on one end of the second connection pad 312, the third fixing block 311, the winding plate 124 and the second fixing block 3031 to connect the second connection pad 312, the third fixing block 311, the winding plate 124 and the second fixing block 3031 together. Moreover, the second dowel slides in the second sliding hole 3121.

Understandably, the pair of winding plates 123,124 expands or contracts on the basis of the movement of the pair of second cam followers 303 which are move following the cam surfaces of the cam 301, so that the winding plates 123,124 expands by the control of the cam 301 during the process of winding and contracts by the control of the cam 301 after winding, thereby the cell core can be easily drawn from the winding assembly 12.

Preferably, the winding assembly control component 144 further includes a first balancing weight 22 and a second balancing weight 23. One end of the first balancing weight 22 is fixed to the winding assembly supporting block 143. And one end of the second balancing weight 23 is fixed to the other end of the first balancing weight 22. The first balancing weight 22 and the second balancing weight 23 are both used to balance the weight of the winding assembly supporting block 143, thus the rotation of the winding assembly supporting block 143 and the winding assembly 12 are steadily.

Figure 5:
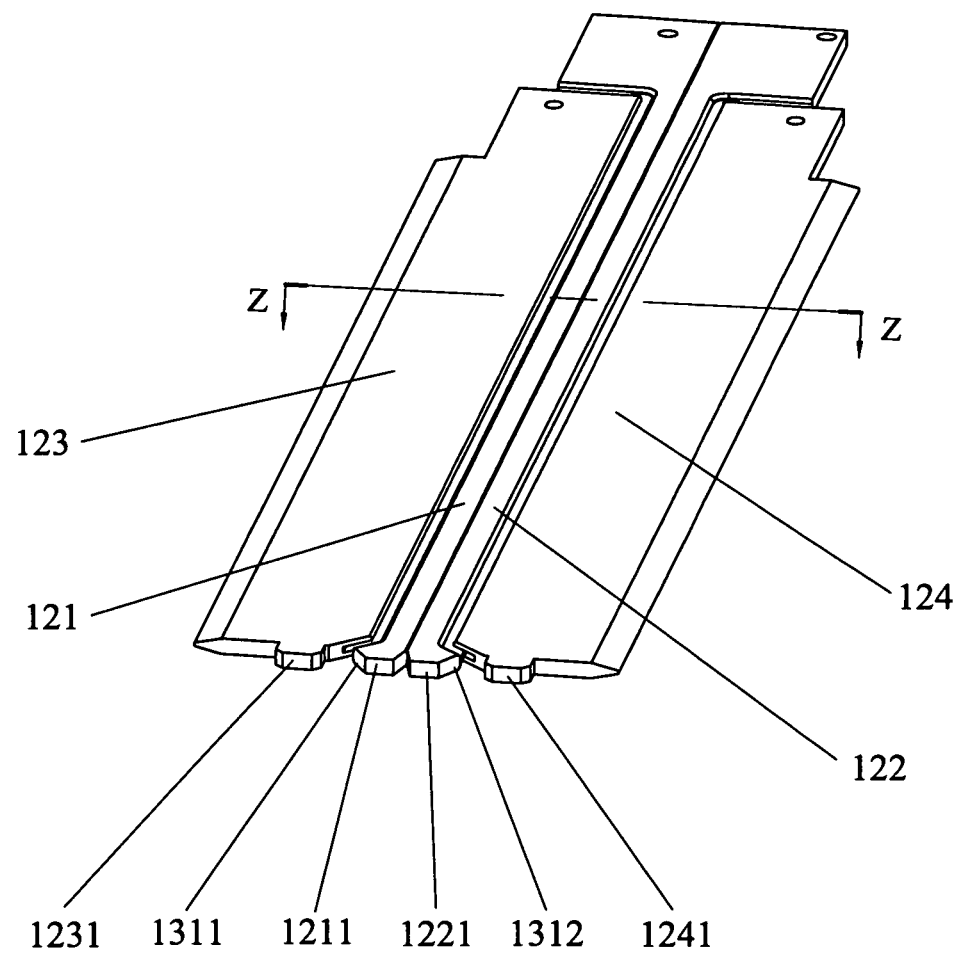
FIG. 5 is a perspective view showing the winding assembly.
Figure 6:
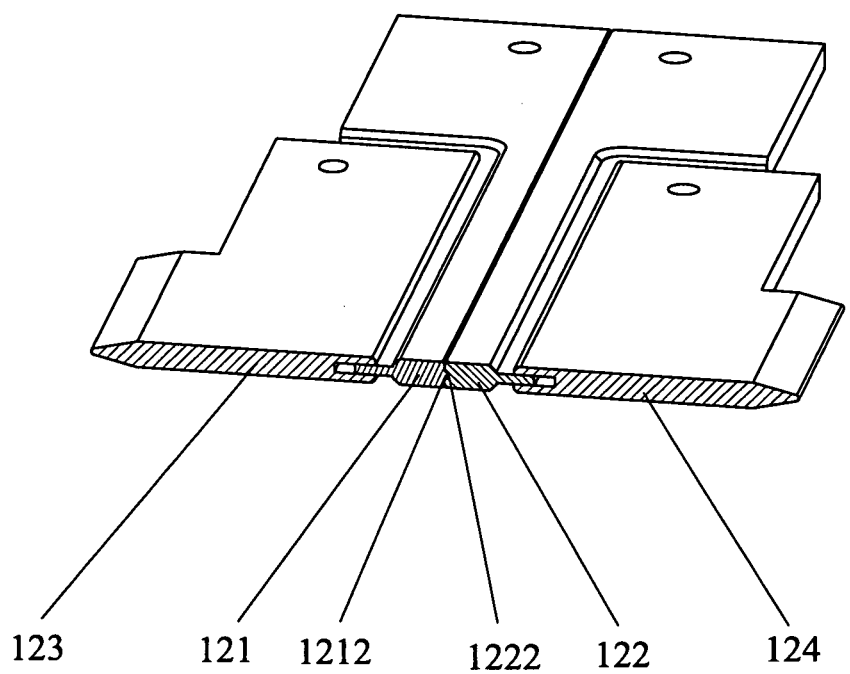
FIG. 6 is a cross-sectional side view of the winding assembly shown in FIG. 5 taken along the line Z-Z of FIG. 5.

FIGS. 5-6 illustrate the detailed structure of the winding assembly 12. A convex portion 1212 with a V-shaped cross section is formed on one side of the winding needle 121 and a V-shaped concave portion 1222 is formed on one side of the winding needle 122. The convex portion 1212 fits into the concave portion 1222 separably to grip or release a separator. The winding plate 123 is provided on the other side of the winding needle 121 and the winding plate 124 is provided on the other side of the winding needle 122. Moreover, the winding plate 123 contacts to the winding needle 121 separably and the winding plate 124 contacts to the winding needle 122 separably. Two first protrusions 1211, 1221 are formed on two winding needles 121,122 respectively and two second protrusions 1231, 1241 are formed on two winding plates 123, 124 respectively. Specifically, both the side 1311 of the first protrusion 1211 of the winding needle 121 and the side 1312 of the first protrusion 1221 of the winding needle 122 are inclines.

Figure 7:
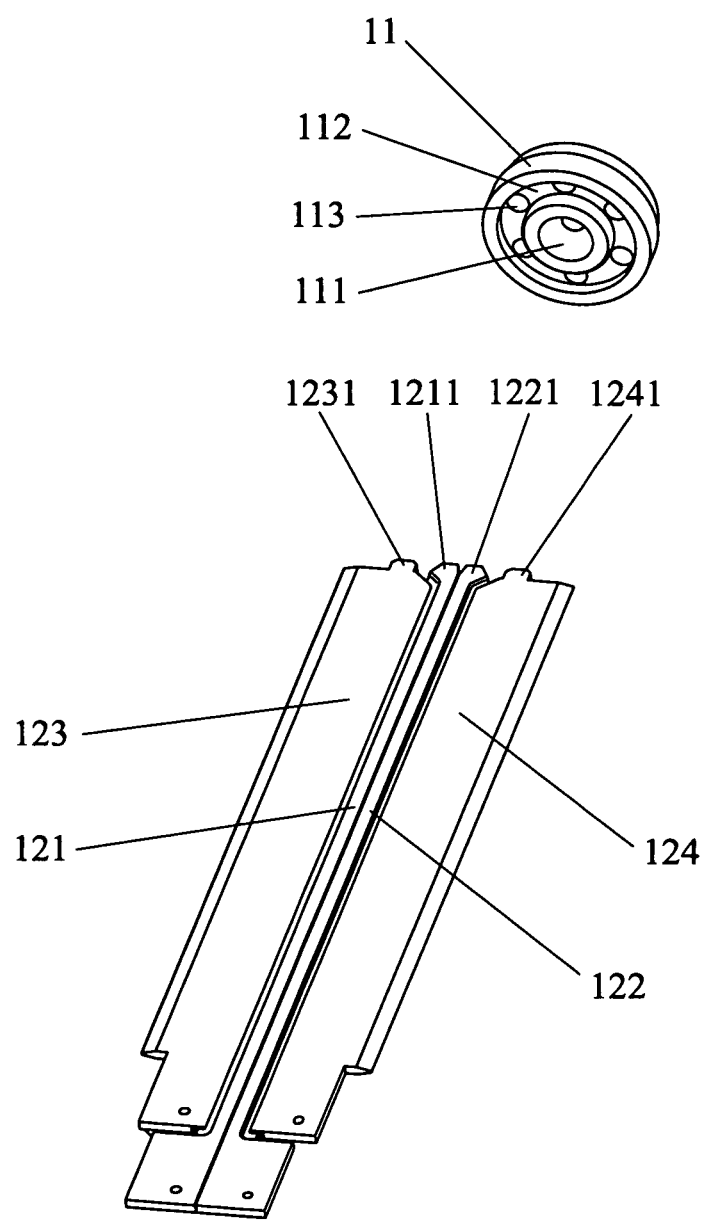
FIG. 7 is a state view illustrating that the winding assembly is unlocked by the locking cap.
Figure 8:
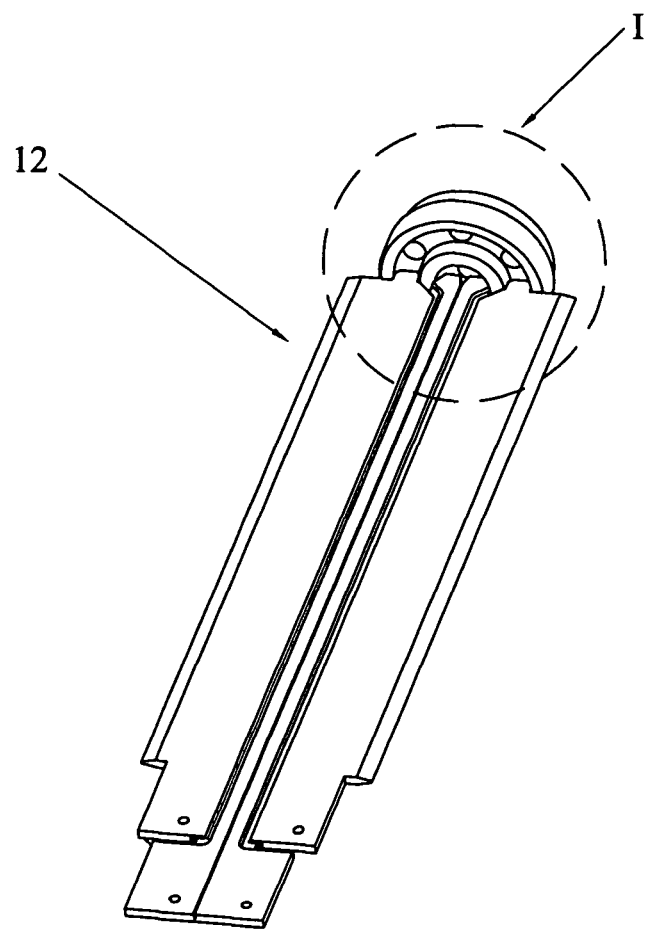
FIG. 8 is a state view illustrating that the winding assembly is locked by the locking cap.
Figure 9:
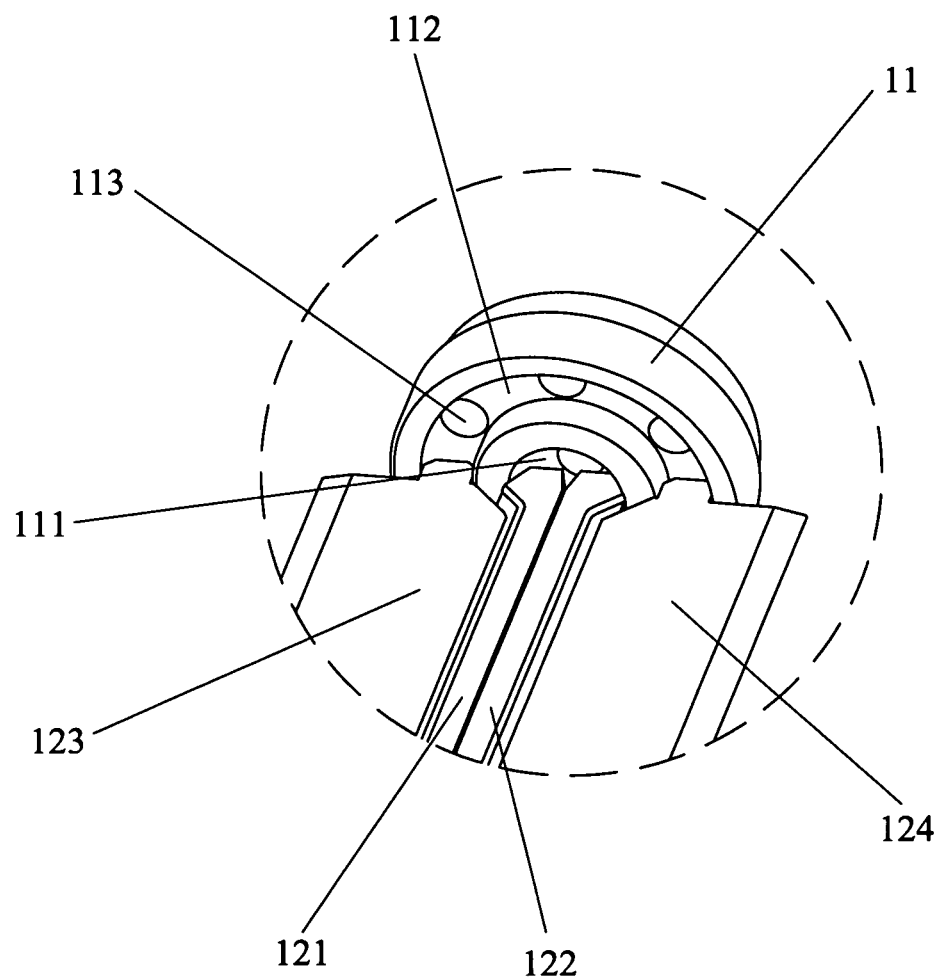
FIG. 9 is a partial enlarged view of the part I of FIG. 8.

Referring to FIGS. 7-9, a taper groove 111 and a ring groove 112 concentric thereto are formed in the locking cap 11 in sequence. And a plurality of circular holes 113 is formed on the bottom of the ring groove 112 symmetrically. Two first protrusions 1211, 1221 fit into the taper groove 111 and two second protrusions 1231, 1241 fit into two circular holes 113 of the ring groove 112.

Referring to FIGS. 1-9, the operation principle of the present invention illustrates as follows. Initially, the winding assembly 12 is located far from the locking cap 11. The pair of winding needles 121,122 is open and two winding plates 123, 124 contact to the pair of winding needles 121,122 respectively. When the winding process begins, two separator supply units (not shown) supply two separators to a separator fixing unit (not shown) respectively to fix the two separators. Then, the first power source 15 drives the moving seat 13 to move on the supporting seat 102 in the direction of the arrow Q shown in FIG. 1 until one of the separators is gripped in the pair of winding needles 121,122. Meanwhile, the second power source 16 drives the cam 301 to move in the opposite direction of the arrow Q shown in FIG. 1 through driving the connector 141 and the transmission shaft 145. Two first cam followers 302 move following the cam surfaces of the cam 301 to control the pair of winding needles 121,122 to contract and grip the above-mentioned separator. And two second cam followers 303 move following the cam surfaces of the cam 301 to control the pair of winding plates 123,124 to expand outward. Next, the cylinder 120 drives the locking cap 11 to move in the opposite direction of the arrow Q until two first protrusions 1211, 1221 of the pair of winding needles 121, 122 and two second protrusions 1231, 1241 of the pair of winding plates 123,124 are fit into the taper groove 111 and the ring groove 112 respectively, thus the pair of winding needles 121,122 and the pair of winding plates 123,124 are locked in the locking cap 11. After that, two electrode supply units (not shown) supply a positive electrode plate and a negative electrode plate along the both sides of the separator gripped in the pair of winding needles 121,122. Then, the drive motor 17 drives the winding assembly 12 to rotate about the axis thereof through driving the transmission sleeve 142 and the winding assembly supporting block 143. After finishing winding, the drive motor 17 stops and the cylinder 120 drives the locking cap 11 to move back to the initial location in the direction of the arrow Q. Simultaneously, the second power source 16 drives the cam 301 to move in the direction of the arrow Q shown in FIG. 1 through driving the connector 141 and the transmission shaft 145. Two first cam followers 302 move following the cam surfaces of the cam 301 to control the pair of winding needles 121,122 to open and release the above-mentioned separator. And two second cam followers 303 move following the cam surfaces of the cam 301 to control the pair of winding plates 123,124 to contract inward. Finally, a cutter (not shown) cuts two separators, the positive electrode plate and the negative electrode plate. An unloading unit (not shown) draws the finished cell core from the winding assembly 12 and transfers the finished cell core to the next procedure. And the first power source 15 drives the moving seat 13 to move back to the initial location.

Understandably, firstly, the separators are gripped in the pair of winding needles firmly through the combination of the convex portion and the concave portion, thus separating a positive electrode plate from a negative electrode plate availably, in turn, preventing a short circuit in the battery, and thereby improving the production quality of the cell core. Secondly, due to the groove and the ring groove formed in the locking cap, the mounting direction of the winding assembly are not limited, thus improving the installation efficiency of the winding device, and thereby improving the production efficiency of the cell core. Thirdly, because two winding plates contact to the pair of the winding needles separably, the pair of winding plates expands before winding and contracts after winding, thus a finished cell core can be easily drawn from the winding assembly.

The foregoing description of the present invention has been presented for purposes of illustration and description. It is not intended to be exhaustive or limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An automatic winding device for cell core, comprising:
   a mounting seat;
   a locking cap mounted on one end of the mounting seat;
   a winding assembly driving mechanism mounted on the other end of the mounting seat; and
   a winding assembly;
   wherein the winding assembly comprises two winding needles and two winding plates, one end of each winding needle is fixed to the winding driving mechanism and the other end thereof is opposite to the locking cap, one end of each winding plate is fixed to the winding driving mechanism and the other end thereof is opposite to the locking cap, the two winding plates are disposed on opposing sides of the pair of winding needles respectively and separably contact the pair of winding needles, one side of one winding needle has a concave portion, one side of the other winding needle has a convex portion that separably fits into the concave portion, a first protrusion is formed on the end of each winding needle opposite to the locking cap and a second protrusion is formed on the end of each winding plate opposite to the locking cap, a corresponding groove and a ring groove are formed in the locking cap, the first protrusion of the winding needle is locked in the groove and the second protrusion of the winding plate is locked in the ring groove.

2. The automatic winding device according to claim 1, wherein both the cross section of the convex portion and the cross section of the concave portion are V-shaped.

3. The automatic winding device according to claim 1, wherein the groove is a taper groove or a circular groove.

4. The automatic winding device according to claim 1, wherein the ring groove has a top and a bottom, a plurality of circular holes are formed on the bottom of the ring groove, and the second protrusion is locked in one or more of the circular holes.

5. The automatic winding device according to claim 1, wherein the winding assembly driving mechanism comprises a moving seat, a first power source, a second power source, a driving motor and a transmission assembly, the first power source is fixed to the mounting seat and one end thereof is fixed to the moving seat, the moving seat is slidably connected to the mounting seat, the second power source is fixed on the moving seat and one end thereof is fixed to the transmission assembly, the driving motor is connected to the transmission assembly through a belt wheel, both one end of the winding needle and one end of the winding plate are connected to the transmission assembly.

6. The automatic winding device according to claim 5, wherein at least a first slider is provided on the bottom of the moving seat, at least a first slider way is provided on the mounting seat, the moving seat slides on the mounting seat by the combination of the first slider and the first slider way.

7. The automatic winding device according to claim 5, wherein the transmission assembly comprises a connector, a drive shaft, a winding assembly supporting block and a winding assembly control component, the connector is fixed to the second power source, one end of the drive shaft is inserted into the connector and the other end thereof is fixed to the winding assembly control component, the drive shaft is connected to the driving motor through the belt wheel, the winding assembly control component is slidably connected to the winding assembly supporting block.

8. The automatic winding device according to claim 7, wherein the connector comprises a connection block, a plane wheel and a pair of rollers, one end of the connection block is fixed to the second power source, the pair of rollers is fixed on the connection block, the plane wheel is sandwiched between the pair of rollers, the end of the drive shaft is fixed in the center of the plane wheel.

9. The automatic winding device according to claim 7, wherein the winding assembly control component comprises a cam, two first cam followers, two second cam followers and two elastic elements, one end of the cam is fixed to the drive shaft and the other end thereof is supported on the winding assembly supporting block through a cam supporting seat fixed on the winding assembly supporting block, two first cam followers are provided on the both sides of the cam respectively and move following cam surfaces of the cam, two second cam followers are provided on the both sides of the cam respectively and move following the cam surfaces of the cam, both one side of the first cam follower and one side of the second cam follower are slidable connected to the winding assembly supporting block, two first cam followers are fixed to opposite ends of one elastic element respectively, two second cam followers are fixed to opposite ends of the other elastic element respectively, two winding needles are fixed to the other sides of two first cam followers respectively and two winding plates are fixed to the other sides of two second cam followers respectively.

10. The automatic winding device according to claim 9, wherein the first cam follower comprises a first fixing block, a first connection shaft and a first roller wheel, a first cavity is formed in one side of the first fixing block, the first roller wheel is accommodated in the first cavity, the first connection shaft passes through the first fixing block and the first roller wheel in sequence for mounting the first roller wheel into the first cavity, the first roller wheel moves following the cam surface of the cam; the second cam follower comprises a second fixing block, a second connection shaft and a second roller wheel, a second cavity is formed in one side of the second fixing block, the second roller wheel is accommodated in the second cavity, the second connection shaft passes through the second fixing block and the second roller wheel in sequence for mounting the second roller wheel into the second cavity, the second roller wheel moves following the cam surface of the cam.

11. The automatic winding device according to claim 10, wherein at least two second sliders are provided on the first fixing block and the second fixing block respectively, at least two second slide ways are provided on the winding assembly supporting block, the first fixing block slide on the mounting seat by the combination of the second slider and one of the second slider ways, the second fixing block slide on the mounting seat by the combination of the second slider and the other of the second slider ways.

12. The automatic winding device according to claim 9, wherein the elastic element is a spring.

13. The automatic winding device according to claim 5, wherein both the first power source and the second power source are cylinders.

14. The automatic winding device according to claim 5, wherein the driving motor is a controllable motor or a step motor.

15. The automatic winding device according to claim 1, wherein further comprising a cylinder, the cylinder is fixed to the locking cap for driving the locking cap to move along the axis thereof.

* * * * *